United States Patent
Kern et al.

(10) Patent No.: US 11,011,883 B2
(45) Date of Patent: May 18, 2021

(54) RADIO FREQUENCY SLAB LASER

(71) Applicant: KERN TECHNOLOGIES, LLC, Wadena, MN (US)

(72) Inventors: Gerald L. Kern, Wadena, MN (US); Paul E. Jackson, Wadena, MN (US)

(73) Assignee: KERN TECHNOLOGIES, LLC, Wadena, MN (US)

( * ) Notice: Subject to any disclaimer, the term of this patent is extended or adjusted under 35 U.S.C. 154(b) by 0 days.

(21) Appl. No.: 16/786,583

(22) Filed: Feb. 10, 2020

(65) Prior Publication Data
US 2020/0274313 A1 Aug. 27, 2020

(30) Foreign Application Priority Data
Feb. 22, 2019 (EP) ..................... 19158714

(51) Int. Cl.
*H01S 3/081* (2006.01)
*H01S 3/08* (2006.01)
*H01S 3/0971* (2006.01)
*H01S 3/03* (2006.01)
(Continued)

(52) U.S. Cl.
CPC ............ *H01S 3/0816* (2013.01); *H01S 3/076* (2013.01); *H01S 3/0804* (2013.01); *H01S 3/0971* (2013.01); *H01S 3/2232* (2013.01); *H01S 3/0315* (2013.01); *H01S 3/08081* (2013.01)

(58) Field of Classification Search
CPC ..... H01S 3/0813–0817; H01S 3/08018; H01S 3/0804–0805; H01S 3/076; H01S 3/08095; H01S 3/086
See application file for complete search history.

(56) References Cited

U.S. PATENT DOCUMENTS

| 4,719,639 A | 1/1988 | Tulip |
| 4,945,543 A | 7/1990 | Sharp |
| 5,748,663 A | 5/1998 | Chenausky |

(Continued)

FOREIGN PATENT DOCUMENTS

DE 20221394 10/2005

OTHER PUBLICATIONS

Chan, Fei, Yong-Xin, Jia, You-Nian Chinese Physics B, 2018, 27(4): 045202 Phase shift effects of radio-frequency bias on ion energy distribution in continuous wave and pulse modulated inductively coupled plasmas http://cpb.iphy.ac.cn/article/2018/1934/cpb_27_4_045202.html#close.

(Continued)

*Primary Examiner* — Tod T Van Roy
*Assistant Examiner* — Sean P Hagan
(74) *Attorney, Agent, or Firm* — Law Office of Michael Antone; Michael Antone

(57) ABSTRACT

A radio-frequency, RF, slab laser 10 with a Z-fold resonator cavity defined by an output mirror 32, a first fold mirror 34, a second fold mirror 36 and a rear mirror 30. The second fold mirror 36 is rotated by an adjustment angle away from the angle it would have if the mirrors were all plane mirrors and directed the round trip beam path by direct reflection. Moreover, the rear mirror 30 is rotated by an adjustment angle that is approximately twice the adjustment angle of the second fold mirror 36. These rotations of the rear mirror 30 and second fold mirror 36 suppresses parasitic mode paths that would otherwise exist.

22 Claims, 9 Drawing Sheets

(51) Int. Cl.
*H01S 3/223* (2006.01)
*H01S 3/07* (2006.01)

(56) References Cited

U.S. PATENT DOCUMENTS

| | | | |
|---|---|---|---|
| 6,137,818 | A | 10/2000 | Jackson |
| 6,256,332 | B1 | 7/2001 | Anikitchev |
| 7,460,577 | B2 | 12/2008 | Morrow |
| 7,545,842 | B2 | 6/2009 | Shackleton |
| 8,873,599 | B2 | 10/2014 | Yamamoto |
| 2002/0061045 | A1 | 5/2002 | Zhang et al. |
| 2004/0076210 | A1 | 4/2004 | DeMaria |
| 2005/0069008 | A1 | 3/2005 | Xin et al. |
| 2005/0094697 | A1 | 5/2005 | Armier |
| 2005/0105581 | A1 | 5/2005 | Seguin |
| 2006/0029116 | A1 | 2/2006 | Shackleton |
| 2007/0195839 | A1 | 8/2007 | Monty |
| 2008/0144675 | A1* | 6/2008 | Spinelli ............... H01S 3/123 372/15 |
| 2010/0189156 | A1 | 7/2010 | Clementi |
| 2014/0334510 | A1 | 11/2014 | Bethel |
| 2015/0318662 | A1 | 11/2015 | Nguyen |

OTHER PUBLICATIONS

L Milliere, K Makasheva, C Laurent, B Despax, L Boudou and G Teyssedre, J. Phys. D: Appl. Phys. 49 015304 (2015) http://iopscience.iop.org/article/10.1088/0022-3727/49/1/015304.

H J Baker, G A J Markillie, J G Betterton and D R Hall Measurement Science and Technology, vol. 9, No. 9 p. 1456 (1998) Spatially resolved measurement of the electrical properties of the rf discharge in a fast-axial-flow laser with a rectangular cross section http://iopscience.iop.org/article/10.1088/0957-0233/9/9/014/pdf.

* cited by examiner

RADIO FREQUENCY SLAB LASER

FIELD OF THE INVENTION

The present disclosure relates to a radio frequency (RF) slab laser.

BACKGROUND

An RF slab laser is a laser with a kind of flat planar construction in which a pair of electrodes are arranged so that their mutually facing inner surfaces form a gap of a certain thickness. When an RF drive signal is applied to the electrodes, a plasma discharge of a gas, such as carbon dioxide, is formed in the gap as a gain medium capable of supporting stimulated emission within a resonator cavity. If the slab is of sufficiently small thickness in relation to the lasing wavelength, the slab forms a waveguide supporting only a finite number of one or more modes across the gap. However, other designs have slabs whose thicknesses are large enough to support an effectively infinite number of non-waveguide free space modes.

The lasing medium of a slab laser is a plasma of a gas, most commonly carbon dioxide as the active molecule, although other gases such as carbon monoxide, helium and nitrogen as well as gas mixtures containing one or more of these gases are known. The electrode gap of a slab laser is hollow and so needs a vacuum-tight envelope to allow the gas plasma discharge to be formed across the gap, the plasma being induced either between a ground electrode and an RF driven electrode, or two RF electrodes that are driven with complementary phases.

U.S. Pat. No. 4,719,639 A (Tulip) shows an example slab laser design, which now may be viewed as conventional. The slab is defined by a pair of rectangular slab electrodes, namely a grounded lower electrode and an upper RF driven electrode, the pair of electrodes having a gap between them of a size corresponding to the slab waveguide thickness. A vacuum enclosure, which is electrically grounded, is arranged to contain the electrodes. An electrical, vacuum-tight, feed-through is provided through a sidewall of the vacuum enclosure to the RF electrode so that RF energy can be supplied to the upper RF electrode via an external impedance matching network. This RF power creates and maintains an excited gas discharge in the slab waveguide between the electrodes. This design approach for the vacuum enclosure is typical. Namely, the vacuum enclosure is made of metal, e.g. aluminum, is electrically grounded, and encloses the electrodes.

U.S. Pat. No. 7,460,577 B2 (Morrow) shows an example design with two slabs. A single resonator fold is formed with a mirror arranged to deflect light by about 160 degrees to create a V-shaped resonator cavity in which the two slabs extend at an angle to each other. (Another common folded cavity design is Z-shaped, i.e. two folds, see e.g. US 2005/0094697 A1 (Armier).) The design of U.S. Pat. No. 7,460,577 B2 is not unusual by virtue of its V-folded slab design, but rather because of how its gas enclosure is realized. The gas enclosure is not arranged outside the electrodes, as is conventional, but rather inside the electrodes. The electrodes sit outside the vacuum enclosure, being arranged in recesses of a convoluted vacuum container surface. As a consequence, the RF energy for exciting the plasma discharge has to be applied through the walls of the vacuum enclosure. The vacuum enclosure cannot therefore be made of metal or other electrically conductive material, as is conventional, but is rather implemented in a ceramic material. (The disclosed construction is with two ceramic halves bonded together.) RF energy supplied to the upper electrode excites a gas discharge through the ceramic material of the gas enclosure, so that the walls of the ceramic material need to be quite thin in these areas. An advantage of this "outboard" enclosure design, compared with the conventional "inboard" enclosure design (exemplified above by U.S. Pat. No. 4,719,639 A), is that a vacuum feed-through is not required to supply RF energy to the driven electrode. A disadvantage is the difficulty caused by having two walls of the vacuum enclosure arranged in the electrode gap, as well as the difficulty of making the two enclosure halves in ceramic material to high precision and then bonding them together in a vacuum tight manner.

BRIEF SUMMARY OF THE INVENTION

According to one aspect of the disclosure, there is provided a laser comprising:
 a resonator cavity defined between a rear mirror and an output mirror;
 a first electrode and a second electrode having respective internal and external surfaces, wherein their respective internal surfaces face each other and are spaced apart by a gap forming a slab of a thickness dimensioned to allow a plasma discharge to be formed in the resonator cavity by driving at least the first electrode with a radio frequency, RF, electrical drive signal; and
 a vacuum enclosure comprising a first part that is integral with the first electrode and a second part that is integral with the second electrode, wherein the first and second electrodes have their respective internal surfaces inside the vacuum enclosure and their respective external surfaces outside the vacuum enclosure.

In some embodiments, the first part of the vacuum enclosure has the form of a lid and the second part has the form of a box, the lid and box together forming a sealed container defining the vacuum enclosure. In particular, the lid may be electrically isolated from the box by a vacuum gasket made of electrically insulating material arranged therebetween. In other embodiments, the vacuum enclosure further comprises a sidewall part, the first part of the vacuum enclosure has the form of a lid and the second part of the vacuum enclosure has the form of a base, and wherein the lid, base and sidewall part together form a sealed container defining the vacuum enclosure. In these embodiments, there are a number of options for electrically isolating the lid from the base. For example by: (i) the sidewall part being made of electrically insulating material; and/or (ii) a vacuum gasket made of electrically insulating material arranged between the lid and the sidewall part; and/or (iii) a further vacuum gasket made of electrically insulating material arranged between the sidewall part and the base.

An advantage of the proposed design is that inductors that are used to impedance match the laser with an RF source can be mounted outside the vacuum enclosure and so can be removed and replaced with inductors of different inductance values in order to adjust the impedance matching, so as to obtain a good matching, without having to access the vacuum enclosure and therefore without having to disturb the cavity components. In particular, the laser may further comprise a plurality of inductors connected between the external surface of the first electrode and the external surface of the second electrode and arranged lengthwise along the slab, said inductors forming part of an impedance matching network, wherein the inductors are removably attached so that they can be exchanged without accessing the vacuum enclosure.

The laser may further comprise an RF source. The RF source may be connected to the external surface of the first electrode and operable to supply a first RF electrical drive signal to the first electrode to generate the plasma discharge in the gap.

In some embodiments, the external surface of the second electrode is connected to an electrical ground. In other embodiments, the RF source is connected to the external surfaces of both the first and second electrodes and is operable to supply a second RF electrical drive signal to the second electrode that is out of phase with the first RF electrical drive signal to the first electrode, thereby to generate the plasma discharge in the gap.

In addition, an outer shield may be arranged to surround the first and second electrodes so as to provide a shield for RF radiation generated by the laser during operation. The RF shield is connected to an electrical ground.

In some embodiments, the thickness of the slab is dimensioned to support a finite number of discrete waveguide modes and the slab has a width dimensioned to support free space modes. In other embodiments, the thickness of the slab is dimensioned to support free space modes and the slab has a width dimensioned to support free space modes.

The proposed single slab design is not only implementable with a simple cavity, but also with a fold cavity. Namely, the laser in some embodiments may further comprise one or more fold mirrors, e.g. one, two or three fold mirrors to form a V-fold, Z-fold or Σ-fold respectively. Each fold mirror is arranged at an end of the slab to provide the resonator cavity with a laser optical resonator path including an additional forward and backward traversal of the slab.

One favored embodiment has a Z-fold cavity. This is formed by providing first and second fold mirrors which, together with the output and rear mirrors, form a Z-fold cavity arrangement. The resonator cavity thus has a round trip beam path that traverses the slab a first time from the output mirror to the first fold mirror, a second time from the first fold mirror to the second fold mirror and a third time from the second fold mirror to the rear mirror, and then back again with fourth, fifth and sixth traversals from the rear mirror to the second fold mirror, the second fold mirror to the first fold mirror, and from the first fold mirror to the output mirror respectively. In particular, to avoid parasitic mode paths which may otherwise exist, the second fold mirror can be rotated by an adjustment angle away from the angle it would have if the mirrors were all plane mirrors and directed the round trip beam path by direct reflection, and the rear mirror can be rotated by an adjustment angle that is approximately twice the adjustment angle of the second fold mirror away from the angle it would have if the mirrors were all plane mirrors and directed the round trip beam path by direct reflection. Moreover, it may be beneficial as a consequence of the above adjustments to displace the rear mirror from the position it would have if the mirrors were all plane mirrors and directed the round trip beam path by direct reflection by an amount at least approximately equal to its adjustment angle multiplied by the distance from the second fold mirror to the rear mirror.

According to another aspect of the disclosure, there is provided a laser comprising:
a first electrode and a second electrode having respective first and second mutually facing surfaces that are spaced apart by a gap to form a slab, the gap being dimensioned to allow a plasma discharge to be formed by applying a radio frequency, RF, electrical drive signal across the gap; and
a Z-fold resonator cavity including the slab and defined by an output mirror, a first fold mirror, a second fold mirror and a rear mirror, the resonator cavity comprising a round trip beam path that traverses the slab a first time from the output mirror to the first fold mirror, a second time from the first fold mirror to the second fold mirror and a third time from the second fold mirror to the rear mirror, and then back again with fourth, fifth and sixth traversals from the rear mirror to the second fold mirror, the second fold mirror to the first fold mirror, and from the first fold mirror to the output mirror respectively,
wherein the second fold mirror is rotated by an adjustment angle away from the angle it would have if the mirrors were all plane mirrors and directed the round trip beam path by direct reflection, and
wherein the rear mirror is rotated by an adjustment angle that is approximately twice the adjustment angle of the second fold mirror away from the angle it would have if the mirrors were all plane mirrors and directed the round trip beam path by direct reflection.

The rear mirror may beneficially be displaced from the position it would have, if the mirrors were all plane mirrors and directed the round trip beam path by direct reflection, by an amount at least approximately equal to its adjustment angle multiplied by the distance from the second fold mirror to the rear mirror.

One or more of the mirrors may be curved. The output mirror and/or the end mirror may be curved. The first and/or second fold mirrors may be curved. It is possible for the rear and/or output mirrors to be plano, especially if the mode control in the lateral direction is controlled by curvature in one or both of the fold mirrors.

By way of example, some typical values for the angles and dimensions are as follows. The first fold mirror deflects light between the output mirror and second fold mirror by an angle of 180 degrees minus a first deflection angle, wherein the first deflection angle is between 5 and 10 degrees. The second fold mirror deflects light between the first fold mirror and the rear mirror by an angle of 180 degrees minus a second deflection angle, wherein the second deflection angle is between 5 and 10 degrees plus or minus the adjustment angle of the rear mirror, wherein the adjustment angle of the rear mirror is between 1 and 5 degrees. Example values for the round trip beam path are lengths of between twice 500 millimeters and 2000 millimeters.

In some embodiments, the output mirror provides output coupling at an edge region thereof or adjacent thereto.

One possible construction for the Z-fold resonator cavity design of this aspect is for the first and second electrodes to have respective first and second external surfaces as well as respective first and second mutually facing surfaces, wherein for assisting formation of the plasma discharge a vacuum enclosure is provided comprising a first part that is integral with the first electrode and a second part that is integral with the second electrode, wherein the first and second electrodes have their respective first and second mutually facing surfaces inside the vacuum enclosure and their respective first and second external surfaces outside the vacuum enclosure.

BRIEF DESCRIPTION OF THE DRAWINGS

In the following, the present invention will further be described by way of example only with reference to exemplary embodiments illustrated in the figures.

DETAILED DESCRIPTION OF THE PREFERRED EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

In this document, we use the following well known terms with their standard definitions, namely:

waveguide: when the slab thickness 't' and slab length 'ls' satisfy the condition $(t/2)^2/(\lambda ls) \ll 1,$ where $\lambda$ is the lasing wavelength.

unstable resonator: a resonator which violates stability condition $0 < g1g2 < 1$ where $g1 = \left(1 - \frac{L}{R1}\right), g2 = \left(1 - \frac{L}{R2}\right)$ where L is the cavity length and R1 & R2 are the respective radii of curvature of the end mirrors, R>1 being a concave/converging mirror and R<1 being convex/diverging mirror, and the resonator magnification, M=R1/R2.

negative branch resonator: a resonator with a magnification per round trip of less than minus unity.

positive branch resonator: a resonator with a magnification per round trip of greater than plus unity.

confocal (unstable) resonator: a resonator in which the end mirrors have radii of curvature such that R1+R2=2 L.

Figure 1:
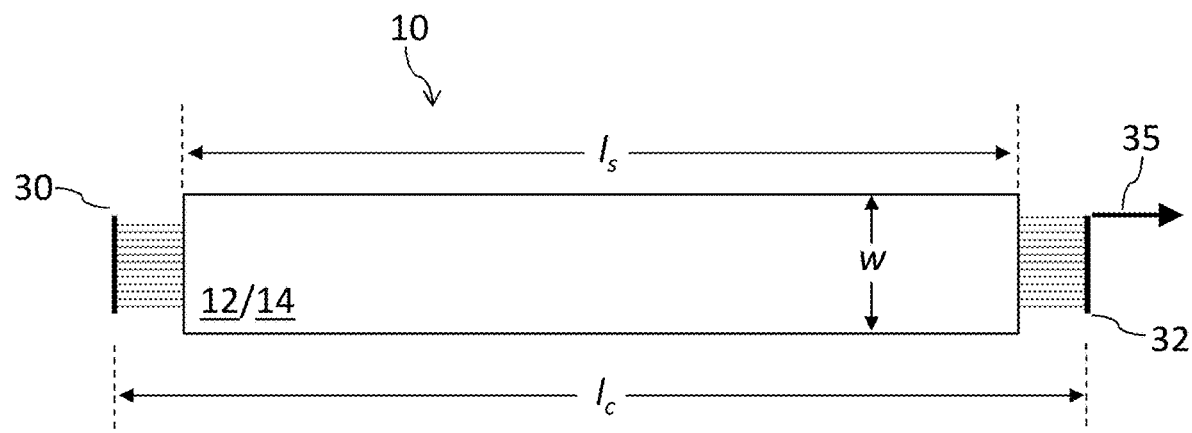
FIG. 1 is a schematic plan view of a slab laser according to an embodiment of the invention.
Figure 2:
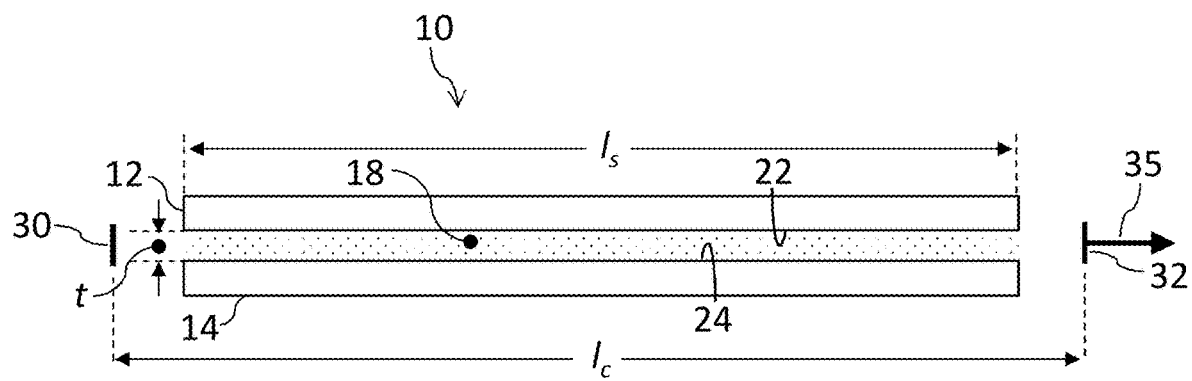
FIG. 2 is a schematic side view of the slab laser of FIG. 1.

FIGS. 1 and 2 are schematic plan and side views of a slab laser 10 according to an embodiment of the invention. The laser comprises a first electrode 12 and a second electrode 14 having respective first and second mutually facing surfaces 22 and 24 that are spaced apart by a gap of thickness 't', and each have a width 'w' and a length 'ls' to form a slab. The gap is dimensioned to allow a plasma discharge, shown schematically with the stippling 18, to be formed by applying a radio frequency, RF, electrical drive signal to at least one of the electrodes 12 and 14. A resonator cavity for the laser is formed by a pair of mirrors 30, 32. Mirror 30 is an end reflector of ideally 100% reflectivity. Mirror 32 is an output coupler which may provide output coupling by being partially transmissive (as would be a usual choice for a stable resonator design), or, as schematically illustrated, with edge coupling by configuring the cavity such that a small portion of the beam path misses the lateral edge of the output mirror (as would be a usual choice for an unstable or confocal resonator design) so that the output beam, labelled 35, is emitted from the side of the output mirror 32. With an unstable resonator design or a confocal (unstable) resonator design, another option is to provide a variable reflectivity coating on the output mirror, so that the reflectivity falls off towards the lateral edge of the mirror and hence the mirror becomes partially transmissive at its lateral peripheries. The resonator cavity has a length 'lc', the resonator cavity length being half the round trip beam path. Because of construction considerations, the cavity mirrors are placed outside the slab, so the cavity length is greater than the slab length. It will also be understood that the cavity mirrors may be planar or curved. If they are curved, this curvature may be in respect of the plane of the slab, i.e. to affect the focusing as visible if a ray diagram were added to the plan view of FIG. 1, and/or the vertical perpendicular to the slab plane, i.e. to affect focusing as visible if a ray diagram were added in the side view of FIG. 2. When not specifically mentioned in this document, by mirror curvature we mean curvature in respect of the slab plane, since with a slab it is resonator mirror curvatures in the horizontal free space direction that principally affect the coupling efficiency of the waveguide modes re-entering the waveguide after reflection, since the mode phase front curvatures are passed back and forth directly through the slab. On the other hand, in the other, orthogonal direction, i.e. the waveguide direction, the waveguide modes have plane phase-front curvatures when they pass along the waveguide and free-space modes phase front curvatures in-between the waveguide and the resonator mirrors, so the resonator mirror curvature in this direction is of lesser importance. (This is why sometimes spherical mirrors are used for convenience in which the curvature is optimized for the free-space direction, since the curvature in the waveguide direction is not so critical.)

Figure 3:
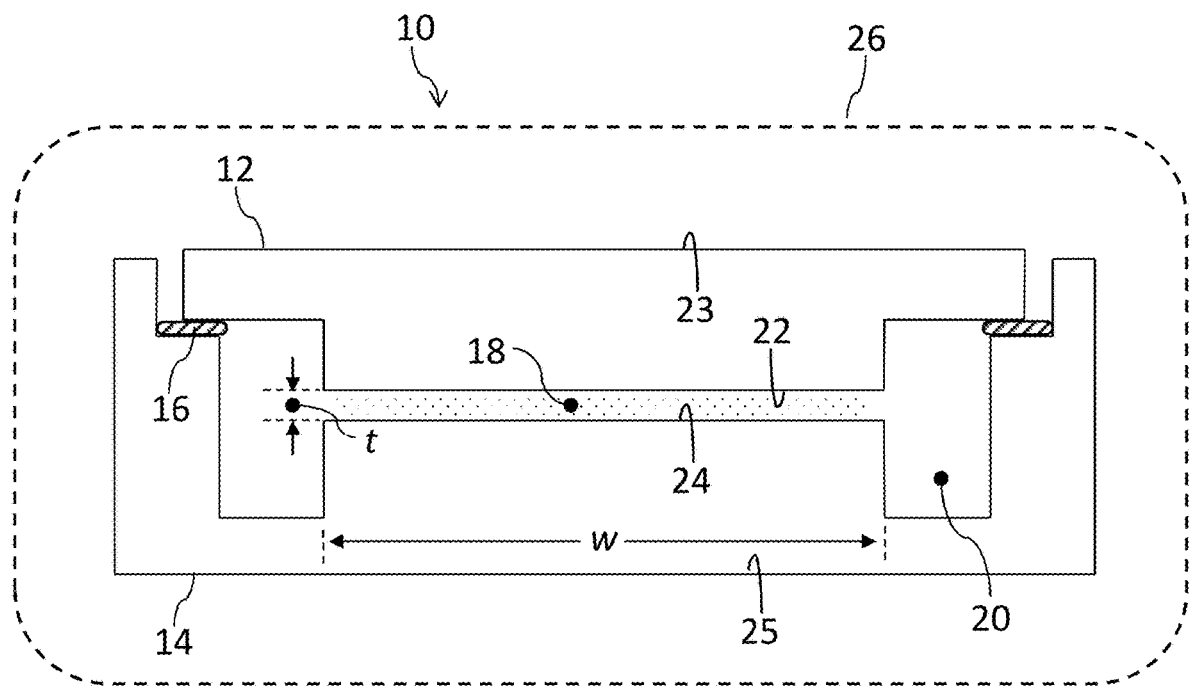
FIG. 3 is a schematic cross-section through a section part way along the slab of FIG. 1.

FIG. 3 is a schematic cross-section through a section part way along the slab of FIGS. 1 and 2. It is shown how the first and second electrodes 12 and 14 are used to form a vacuum enclosure. The vacuum enclosure comprises a first part that is integral with the first electrode 12 and a second part that is integral with the second electrode 14. The first and second electrodes 12 and 14 have their respective, mutually facing internal surfaces 22 and 24 inside the vacuum enclosure and their respective external surfaces 23 and 25 outside the vacuum enclosure. The first part of the vacuum enclosure has the form of a lid and the second part has the form of a box, the lid and box together forming a sealed container defining the vacuum enclosure. The lid is electrically isolated from the box by a vacuum gasket 16 made of electrically insulating material, e.g. a suitable synthetic rubber or fluoropolymer elastomer. A gas reserve volume 20 is provided along each side of the slab to ensure good supply of gas to the gap region during operation.

An RF outer shield 26 is also schematically illustrated. The RF shield 26 is arranged to surround the slab, i.e. the first and second electrodes, and is connected to an electrical ground. An RF outer shield may be needed to comply with EMI regulations, even if not needed for any functional reason. If both electrodes are driven with RF, which is one possible drive option, then the RF shield can provide the return path to ground for both electrodes. That is, in some embodiments, the first electrode can be an RF electrode and the second electrode grounded, whereas in other embodiments both electrodes could be RF electrodes with their RF drives out of phase and with the return path via a separate ground, such as the RF shield.

Figure 4:
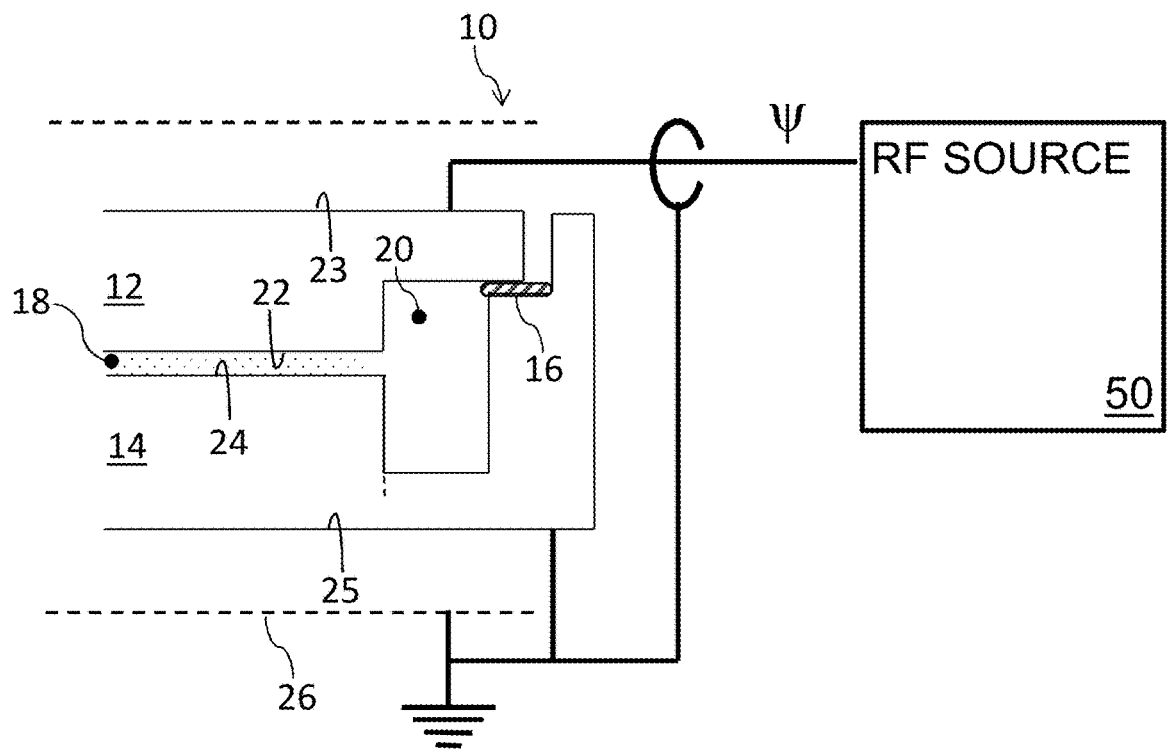
FIG. 4 is a schematic drawing showing electrical drive connections to the slab laser as shown in FIG. 3.

FIG. 4 is a schematic drawing showing one possible electrical drive connection arrangement to the slab laser as shown in FIG. 3. An RF source 50 is used to supply an RF drive current of waveform 'Ψ' to the external surface 23 of the first, lid electrode 12 while the second, box electrode 14, and also the RF shield 26, are connected to electrical ground. The RF source 50 thus supplies an RF electrical drive signal to the first electrode 12 to generate the plasma discharge 18 in the slab.

A significant advantage of this unitary construction of the vacuum enclosure using the electrodes as an integral part is that the RF drive signal connection to the first electrode can be made without a vacuum feedthrough through the walls of the vacuum enclosure. The electric circuit elements of the RF drive circuit relevant for impedance matching the laser cavity with the RF drive circuit can thus be arranged outside the vacuum enclosure where they are accessible without having to break into the vacuum enclosure which inevitably risks disturbing the relative positions and alignments of the plasma discharge gap, cavity mirrors and other elements of the cavity that are strongly interdependent. This enables the laser cavity to be impedance matched to the RF drive circuit more easily by swapping out these circuit elements, e.g. inductors and capacitors, without disturbing the cavity. Moreover, if any of the circuit elements are manually adjustable, then this adjustment may also be carried out without disturbing the cavity.

Figure 5A:
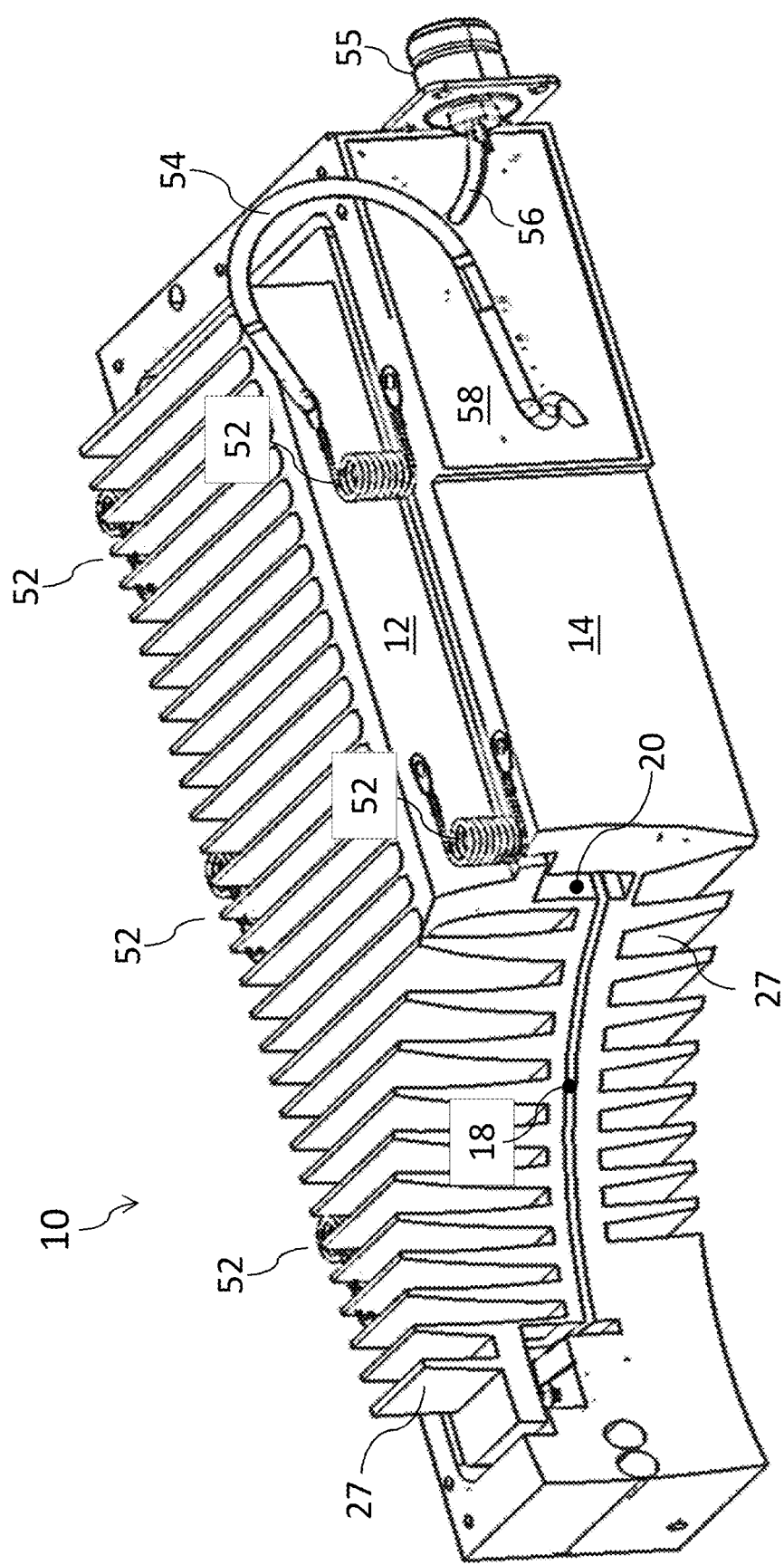
FIG. 5A is a perspective, partially cut-away drawing of a prototype laser conforming to the design as shown in FIGS. 1 to 4.
Figure 5B:
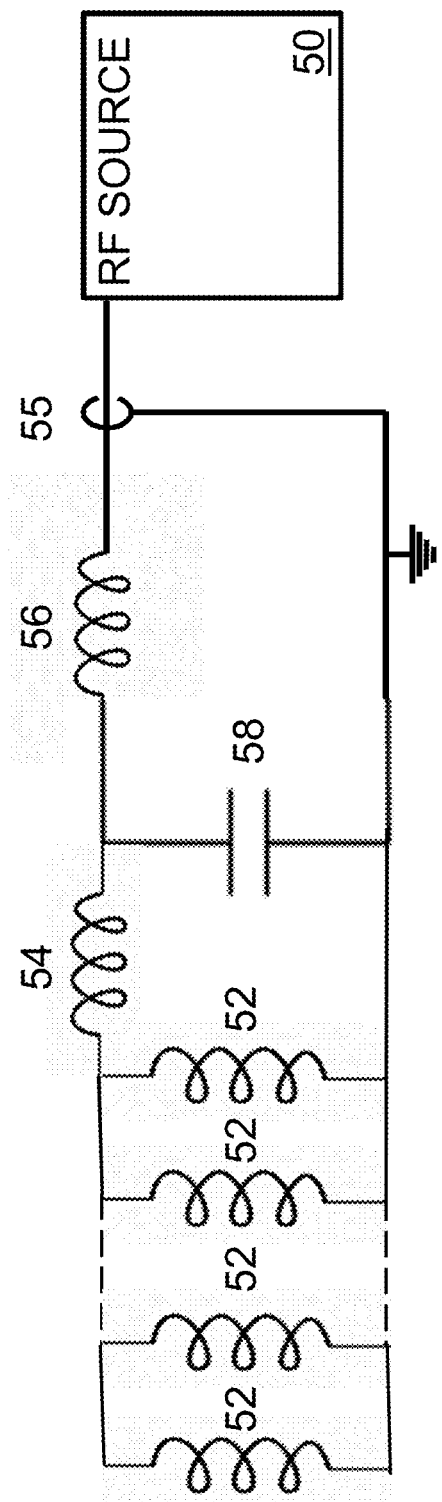
FIG. 5B is a circuit diagram showing the circuit as formed by the laser of FIG. 5A and its RF components.

FIG. 5A is a perspective, partially cut-away drawing of a prototype laser 10 conforming to the design described with reference to FIGS. 1 to 4. FIG. 5B is a circuit diagram showing the circuit as formed by the laser of FIG. 5A and its RF components. FIG. 5A is included in particular to show the circuit elements relevant for the impedance matching of the resonator cavity to the RF drive circuit shown in FIG. 5B. The following paragraphs should be read referring both to FIG. 5A to appreciate the physical construction and FIG. 5B to appreciate the RF design. In FIG. 5A, many of the features described in relation to FIGS. 1 to 4 can be seen, principally the lid and box electrodes 12 and 14, the plasma discharge space 18 formed by the gap of thickness 't' between the electrodes, and the gas reserve volumes 20 running along each side of the slab. The RF supply from the RF source 50 is supplied to the laser 10 via an RF input connector 55 physically attached to the outside of the box electrode 14. The connector's outer conductor is electrically connected to the box electrode 14 via its physical attachment and is electrically grounded, while the connector's inner RF conductor 56 is of course electrically isolated from electrical ground.

The RF drive connector terminates with a section of the conductor 56, that forms an inductor relevant for the impedance matching, on the external plate of a plate capacitor 58. The plate capacitor 58 can be implemented by fixing an unstructured printed circuit board (PCB) blank onto an area of the side of the box electrode 14. The substrate part of the PCB blank forms the dielectric of the plate capacitor, and is in physical contact with the lower, box electrode 14, over the area of the PCB, that area of the box electrode 14 thus forming one plate of the capacitor, while the other plate of the capacitor is formed by a metal layer of the PCB blank that faces outwards and to which the inductor 56 is connected. Spaced apart along the length of the slab, resonating inductors 52 are arranged on either side of the slab, with one end of each inductor 52 connected to the lid electrode 12 and the other end connected to the box electrode 14. One of the inductors 52 has its lid electrode terminal additionally connected to the outer plate of the capacitor 58 by a conductor 54 that forms a further impedance matching network inductor. This particular prototype has three inductors along one side of the slab (the far side in the figure) and three on the other side (near side in the figure), although one is not shown on the near side because of the partial cut-away. The inductors may be arranged in staggered fashion along the slab as illustrated or in opposing pairs. The number of inductors on each side of the slab need not be the same. The optimum number of inductors 52 will depend on design factors such the cavity length. It is useful to arrange the inductors pairwise or staggered along the length of the slab, but other arrangements are possible.

The number of inductors and their inductance values are determined by the following considerations. First, the total inductance value of the inductors 52, L, should resonate with the capacitance of the parallel plate electrodes 12 & 14, C, at approximately the RF drive frequency, 'f', according to the relationship, $f=1/(2\pi \sqrt{LC})$. 'C' is typically a few hundred pico-Farads and 'L' is typically a few nano-Henrys and 'f' is typically in the range of 27-144 MHz. Second, the number of inductors 52 is determined by the length and characteristic strip line impedance of the electrodes 12 & 14 relative to the RF frequency 'f' and the desire to excite the discharge between the electrodes 18 as uniformly as possible along their length for maximum laser power extraction efficiency. By adding inductors 52 between the electrodes 12 & 14 at roughly equal intervals along the electrode length, the RF standing wave voltage amplitude variation can be reduced to typically less than 5-10%. Typically for the industrial RF frequency of 81.36 MHz, the inductors are spaced apart by about 5 centimeters (2 inches) on either side of the electrodes. At resonance, the complex impedance of the electrodes 12 & 14, inductors 52 and discharge 18 is nominally reduced to its real resistive component of typically a few ohms or tens of ohms.

The inductors 52 are removably attached at either end to the electrodes 12 and 14 respectively, so that they can be individually exchanged. The removable attachment may for example be effected by bolts which thread through eyelets at each end of the inductors 52 and screw into threaded holes in the electrodes 12 and 14. The removable attachment of the inductors 52 is a significant practical advantage, since the impedance matching can be adjusted, i.e. tuned, by exchanging individual inductors for ones with different inductance values without having to access the vacuum enclosure, so the risk is removed of inadvertently changing other parameters relevant to the laser operation such as electrode gap or mirror positions relative to each other or the gap.

Incidentally, it can also be seen how the outer surfaces of both electrodes 12 and 14 have cooling fins 27 integrally formed therein. The cooling may be further enhanced in use by supply of forced air past the fins 27.

The designs described above assume that the first and second electrodes are one and the same as the lid and box parts of the vacuum enclosure respectively. However, this need not be the case. It is only necessary that the electrodes are integrally formed as part of the vacuum enclosure in such a way that there is an externally accessible part of each electrode which is outside the vacuum enclosure and to which an electrical connection can be made (for RF and ground, or RF and RF) without a vacuum feedthrough, as well as an internal part of each electrode that is inside the vacuum enclosure to form the slab and associated plasma discharge gap.

For example, either or both of the first and second electrodes could be in part embedded in a dielectric material, or in part coated by a dielectric material, e.g. covering the whole of their inside surfaces. We say "in part", since an external electrical connection to the outside surface of each electrode is needed, so there needs to be some break in any such dielectric material to provide this external electrical access. One possible motivation for embedding one or both of the electrodes in a dielectric would be to change the optical properties of the slab; for example in the case of a waveguiding slab, to change (decrease) the waveguide mode propagation losses, or to introduce spectral discrimination in the form of a distributed Bragg grating etched into the dielectric (e.g. silicon dioxide) applied on the internal surface 22 and/or 24 of one or both of the electrodes 12 and/or 14.

From the above description, it will therefore be understood that our proposed design relationship between the electrodes and the vacuum enclosure is neither the same as the conventional "inboard" electrode design as exemplified by U.S. Pat. No. 4,719,639 A (Tulip), nor the "outboard" electrode design of U.S. Pat. No. 7,460,577 B2 (Morrow), but rather represents a kind of hybrid design in which the electrodes are integral with the vacuum enclosure and are therefore neither "inboard" nor "outboard" in relation to the vacuum enclosure.

Figure 6:
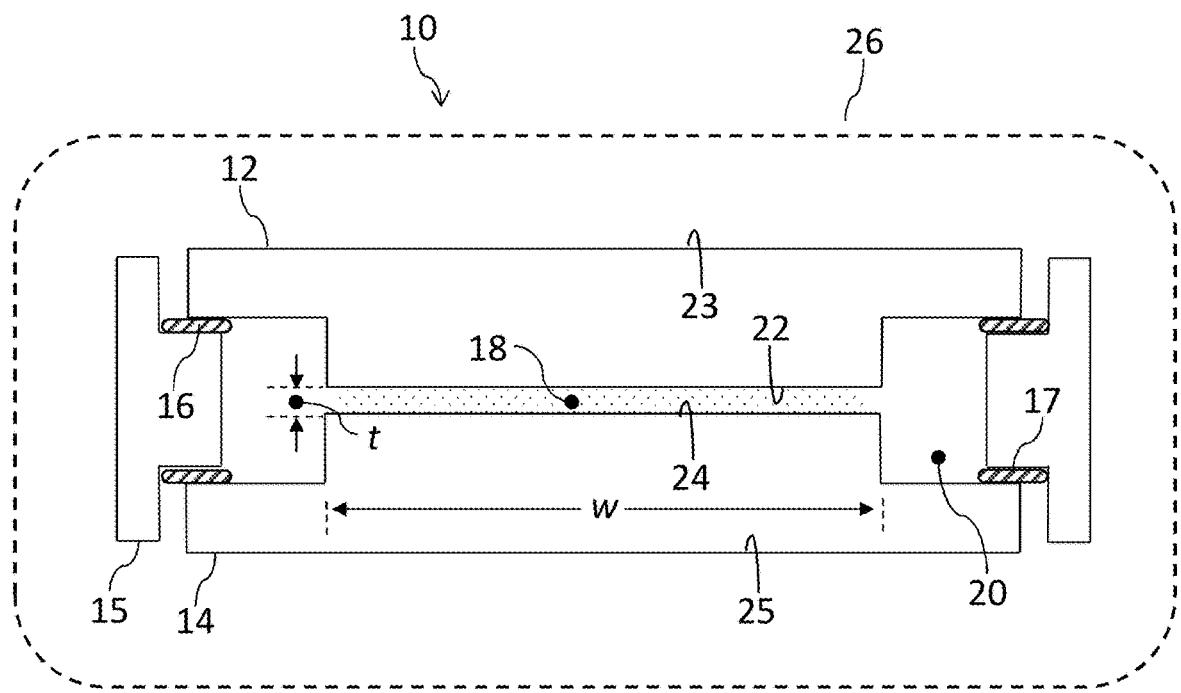
FIG. 6 is a schematic cross-section through a section part way along the slab of FIG. 1 for an alternative construction to that of FIG. 3.

FIG. 6 is a schematic cross-section through a section part way along the slab of FIG. 1 showing an alternative construction to that of FIG. 3. In this alternative, the vacuum enclosure is formed not only of the first and second electrodes 12 and 14, but also by an additional piece 15 separating the electrodes 12 and 14. A first part of the vacuum enclosure is formed by the first electrode 12, which serves as a lid. A second part of the vacuum enclosure is formed by the second electrode 14, which serves as a base. A third part of the vacuum enclosure is formed by a sidewall 15, which completes the box form of the vacuum enclosure, so that the three parts 12, 15, 14 together form a sealed container. The lid, i.e. the first electrode 12, can be electrically isolated from the base, i.e. the second electrode 14, by virtue of the sidewall part 15 being made of an electrically insulating material, such as a ceramic material. In addition, or instead, electrical isolation between the electrodes 12 and 14 can be effected with either or both of the illustrated vacuum gaskets 16 and 17 which separate the parts from each other. Of course this requires that the relevant gasket or gaskets are made of an electrically insulating material, e.g. a suitable synthetic rubber or fluoropolymer elastomer. If electrical isolation between lid and base is provided by one or both of the gaskets 16 and 17, then the sidewall could be electrically conducting, e.g. made of the same metal, or metallic material, as the lid and base. A metal, or otherwise electrically conducting, sidewall may also usefully serve as an electrical ground connection for either or both of the lid and base. This would be particularly useful for embodiments in which both the lid and base parts, i.e. both electrodes, are supplied with an RF drive signal, since then the sidewall part could provide the electrical path to ground for both electrodes.

Figure 7:
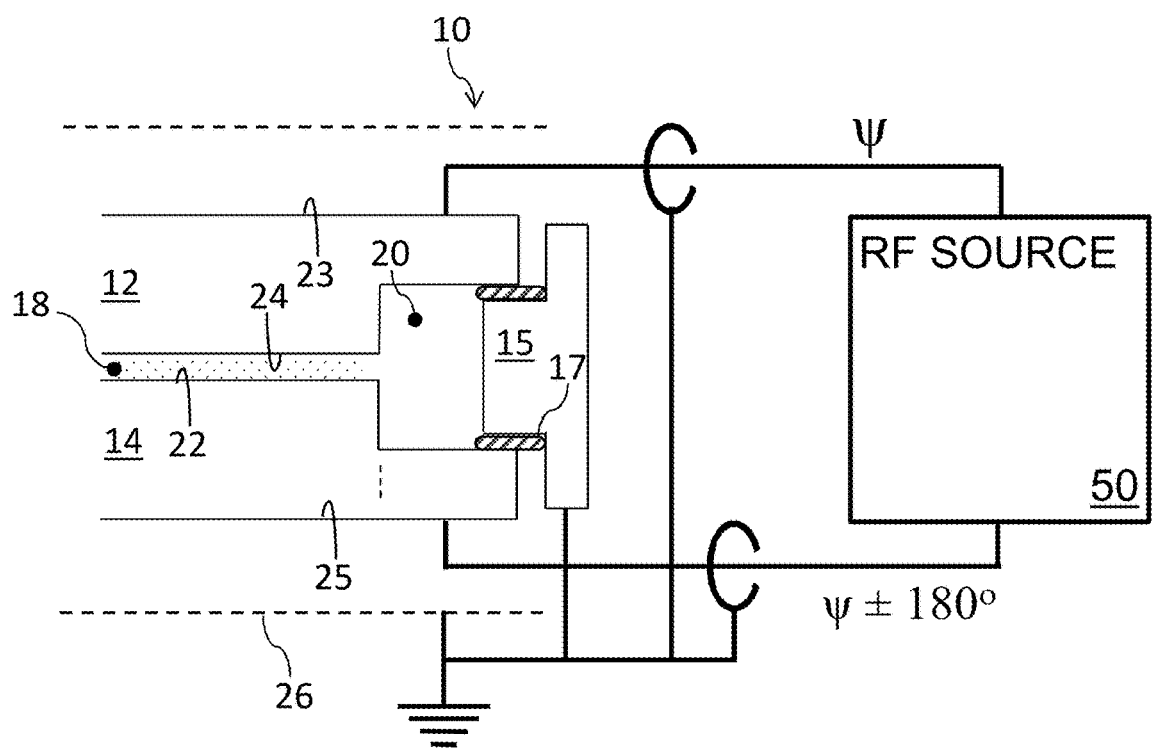
FIG. 7 is a schematic drawing showing electrical drive connections to the slab laser as shown in FIG. 6.

FIG. 7 is a schematic drawing showing one possible form of electrical drive connections to the slab laser as shown in FIG. 6. Here, both electrodes are supplied with an RF drive signal. The RF electrical drive signal supplied to the second electrode 14 is out of phase with that supplied to the first electrode 12 to generate the plasma discharge 18 in the gap. This may be achieved with a phase separation between the RF drive currents of ±180°. The RF source is thus connected to the external surfaces 23 and 25 of both the first and second electrodes 12 and 14. More detail on this kind of antiphase RF drive can be found in U.S. Pat. No. 6,137,818 A (Jackson). Moreover, an electrical ground is connected both to the RF shield 26 and to the sidewall part 15 of the vacuum enclosure (i.e. the sidewall part is made of an electrically conducting material in this example).

In summary of the above, we have described a radio-frequency, RF, slab laser 10 in which the electrodes form an integral part of the vacuum enclosure. First and second electrodes 12, 14 have respective internal surfaces 22, 24 and external surfaces 23, 25. The internal surfaces 22, 24 lie in the vacuum enclosure and form a gap to support a plasma discharge 18. The vacuum enclosure is constructed by a first part, integral with the first electrode 12, and a second part, integral with the second electrode 14, so that the electrode external surfaces 23, 25 lie outside the vacuum enclosure. An RF source 50 can thus supply an RF drive current to the external surface 23 of the first electrode 12 obviating the need for a vacuum feedthrough and also allowing inductors to be fixed on the outside the vacuum enclosure where they can be removed and replaced to achieve impedance matching without disturbing the cavity components.

Referring generally to embodiments of the invention, it will be understood that the proposed design of vacuum enclosure with integral electrodes so that each electrode has an internal surface for generating the plasma discharge and an external surface for contacting to the RF circuit and/or electrical ground can be implemented with a variety of different resonator designs. In particular, the design may be implemented in a hybrid waveguide/free-space resonator, or a hybrid free-space/free-space resonator. In a hybrid waveguide/free-space resonator, the thickness of the slab is dimensioned to support a finite number of discrete waveguide modes and the slab has a width dimensioned to support free space modes. The finite number may be one, i.e. a single mode, or may for example be 2, 3, 4, 5, 6, 7, 8, 9 or 10. In a hybrid free-space/free-space resonator, the thickness of the slab is dimensioned to support free space modes and the slab has a width dimensioned to support free space modes, i.e. effectively an infinite number of modes. A hybrid free-space/free-space resonator could be realized with aspheric mirrors, as described for example in: O. L. Bourne, P. E. Dyer, *A novel stable-unstable resonator for beam* control of rare-gas halide lasers, Data: Optics Communications, ISSN: 0030-4018, Vol: 31, Issue: 2, Page: 193-196, November 1979.

Another aspect of the proposed design of vacuum enclosure with integral electrodes so that each electrode has an internal surface for generating the plasma discharge and an external surface for contacting to the RF circuit and/or electrical ground is that it can implemented not only with a simple resonator cavity as described up to now, but also with folded resonator cavities, where the folded resonator cavity is supported by the single slab. The round trip beam path can thus be made to traverse the slab one extra pair of times for each fold. Each fold will be implemented with a fold mirror and each fold mirror will be arranged at one end of the slab to provide an additional forward and backward traversal of the slab in a beam path between the rear mirror and output mirror. The fold, or folds, pass the beam path back, or back and forth, through the single slab with the fold, or folds, extending in the free-space dimension of the slab, i.e. in the plane of the slab.

Figure 8:
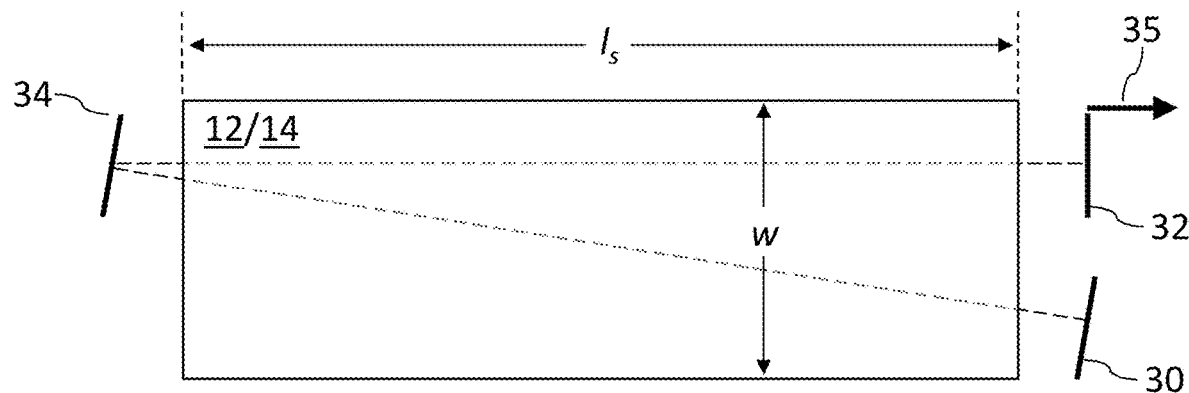
FIG. 8 is a schematic plan view of a slab laser according to a further embodiment with a V-fold cavity formed in a single slab.

FIG. 8 is a schematic plan view of a slab laser according to a further embodiment with a V-fold cavity formed in a single slab. The rear mirror 30 and output mirror 32 are now arranged at the same end of the slab alongside each other and a fold mirror 34 is arranged at the other end of the slab, with the fold mirror 34 and rear mirror 30 tilted by suitable amounts to support the desired lasing mode(s) resonator optical axis. This V-fold configuration with one cavity folding mirror 34 provides the resonator cavity with one additional forward and backward slab traversal, per cavity round trip, i.e. four traversals compared to two for a round trip of a simple cavity as shown in FIG. 1 with no fold mirrors. The single fold thus passes the beam path back through the single slab an extra time with the V-fold extending in the free-space dimension of the slab, i.e. in the plane of the slab.

Figure 9:
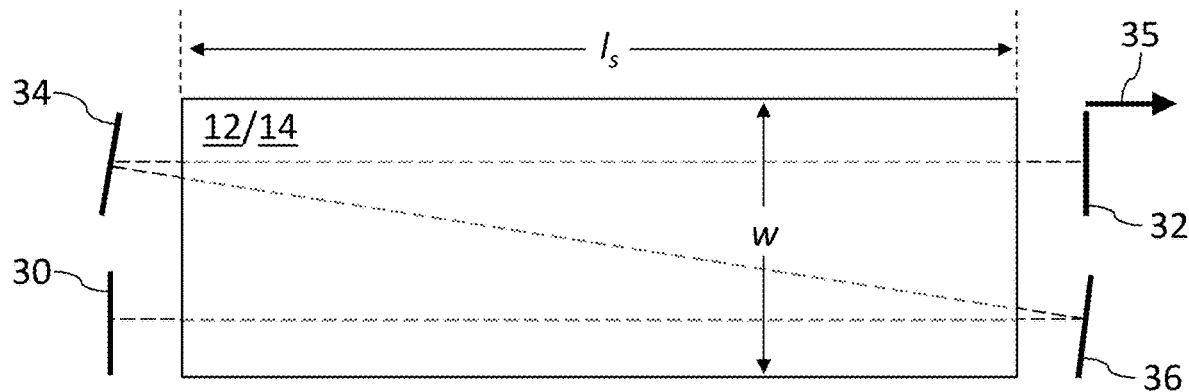
FIG. 9 is a schematic plan view of a slab laser according to a further embodiment with a Z-fold cavity formed in a single slab.

FIG. 9 is a schematic plan view of a slab laser according to a further embodiment with a Z-fold cavity formed in a single slab. The rear mirror 30 and output mirror 32 are arranged at different ends of the slab, with the first fold mirror 34 being arranged alongside the rear mirror 30 and the second fold mirror 36 arranged alongside the output mirror 32. The fold mirrors 34 and 36 are tilted by suitable amounts to support the desired lasing mode(s) resonator optical axis. The resonator cavity is thus defined by the output mirror 32, first fold mirror 34, second fold mirror 36 and rear mirror 30. The cavity's round trip beam path traverses the slab a first time from the output mirror to the first fold mirror, a second time from the first fold mirror to the second fold mirror and a third time from the second fold mirror to the rear mirror, and then back again with fourth, fifth and sixth traversals from the rear mirror to the second fold mirror, the second fold mirror to the first fold mirror, and from the first fold mirror to the output mirror respectively. This Z-fold configuration with first and second cavity folding mirror 34 and 36 provides the resonator cavity with two additional forward and backward slab traversals, per cavity round trip, i.e. 6 traversals. The two folds thus pass the beam path back and forth through the single slab with the Z-fold extending in the free-space dimension of the slab, i.e. in the plane of the slab.

However, introducing folds in the cavity with the single slab design adds the complication that parasitic modes may exist. Parasitic modes are modes that do not traverse the folded cavity as intended, but nevertheless have a round-trip self-reproducing path. They extract energy from the gain medium and can also lead to an earlier saturation of the gain, both of which are of course undesirable. A parasitic mode may or may not couple out of the resonator cavity. A parasitic mode does not contribute to the useful output beam of the laser and reduces the useful optical energy extraction efficiency of the laser.

Figure 10A:
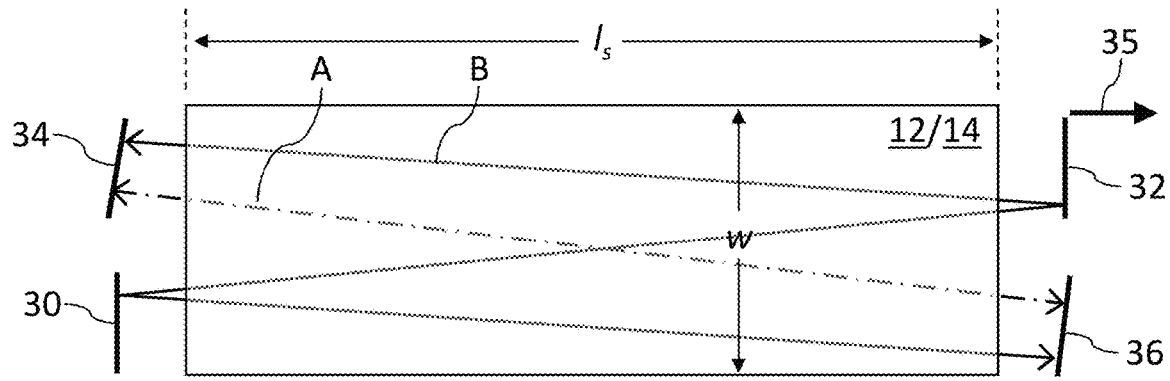
FIG. 10A is a reproduction of FIG. 9 showing possible parasitic resonator mode paths 'A' and 'B' which may arise in the cavity.
Figure 10B:
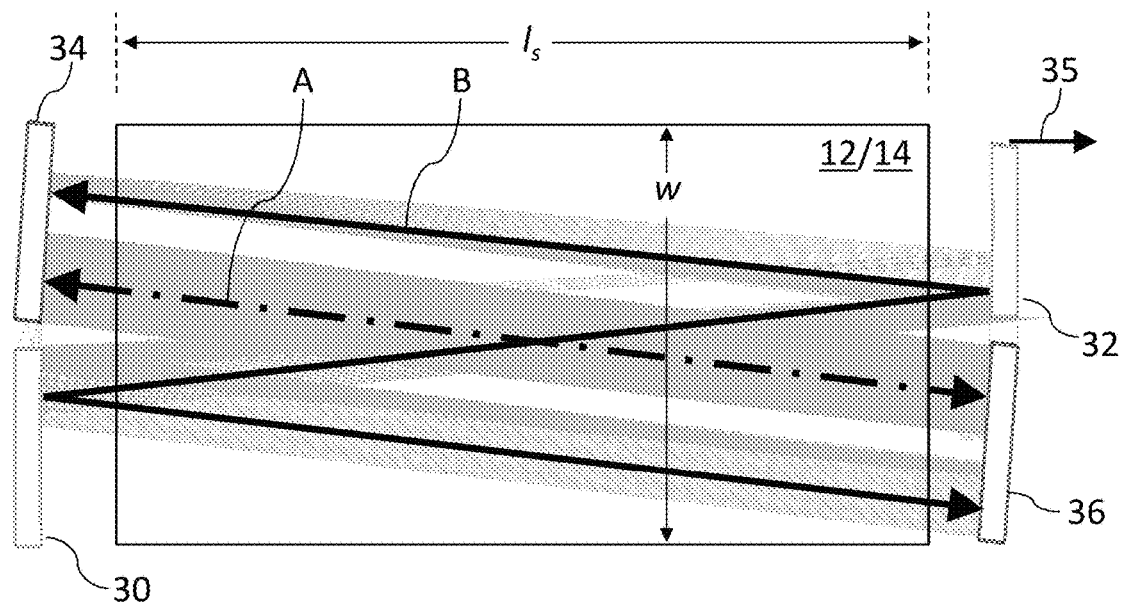
FIG. 10B corresponds to FIG. 10A, but additionally shows modeled ray paths in gray.

FIG. 10A is a reproduction of FIG. 9 showing possible parasitic mode round-trip optical resonator paths A and B which may arise in a Z-fold cavity. FIG. 10B corresponds to FIG. 10A, but additionally shows modeled ray paths in gray which are a swathe of multiple, substantially parallel paths, not simply single lines as schematically shown in FIG. 10A. Parasitic mode path A exists along the path shown with the dot-dashed line back and forth between the two fold mirrors 34 and 36. This parasitic mode path will exist in any symmetric Z-fold resonator. The width of the swathe is limited by the physical width of the reflective surfaces of fold mirrors 34 & 36; it is the width of light cast onto fold mirror 34 by an imaginary light source emanating from fold mirror 36 with the light rays perpendicular to and extending the full width of the reflective surface of fold mirror 36. Equally, it is the width of light cast onto fold mirror 36 by an imaginary light source emanating from fold mirror 34 with the light rays perpendicular to and extending the full width of the reflective surface of fold mirror 34. Parasitic mode path B is a path that may exist when the cavity mirrors are curved, with its presence and exact path and swathe width depending on the mirror curvatures and the physical widths of their reflective surfaces and the physical width of the reflective surfaces of fold mirrors 34 & 36. The multiple paths that make up the swathe of parasitic mode paths B will not be parallel paths, the exact paths depending on the curvature of rear mirror 30. A Z-fold cavity is also capable of supporting other parasitic mode paths with swathes dependent of the physical widths of the reflective surfaces of the mirrors they are reflected by as they complete their round-trip paths.

To avoid such parasitic modes in a Z-fold cavity we propose departing from the conventional geometric arrangement of the mirrors as now discussed in the following.

Figure 11:
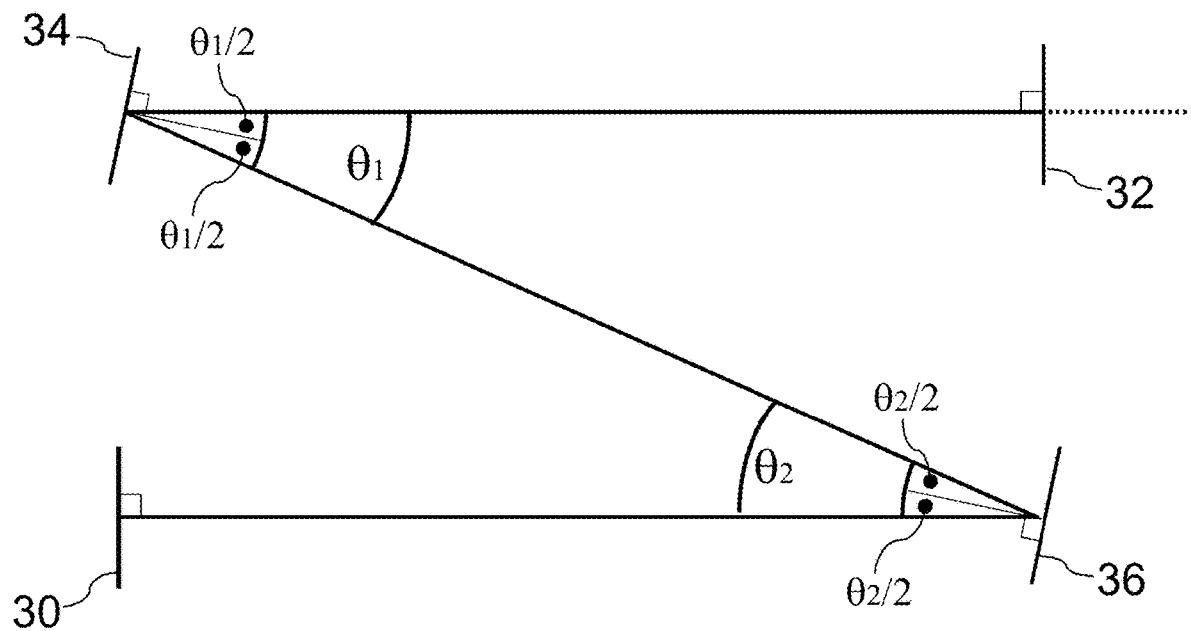
FIG. 11 labels geometrical features of a Z-fold cavity in which the mirrors are conventionally arranged.

FIG. 11 labels geometrical features of a Z-fold cavity in which the mirrors are conventionally arranged, which is how the mirrors would need to be arranged if all the cavity mirrors were plane mirrors, the round trip beam path was defined by an optical axis defined by direct reflection from the mirrors' planar surfaces and the beam paths were the same for both forward and backward traversals. The first fold mirror 34 deflects light between the output mirror 32 and second fold mirror 36 by an angle of $180°-\theta1$. The second fold mirror 36 deflects light between the first fold mirror 34 and the rear mirror 30 by an angle of $180°-\theta2$. The first fold mirror 34 is then tilted away from the angle of the output mirror 32 by an angle $0.5*\theta1$, so as to deflect the beam path by twice that amount, i.e. by an angle $180°-\theta1$. The second fold mirror 36 receives light from the first fold mirror 34 and is tilted away from the angle of the rear mirror 30 by an angle $0.5*\theta2$, so as to deflect the beam path by twice that amount, i.e. by an angle $180°-\theta2$. We note that, if the two deflection angles are the same, i.e. $\theta1=\theta2$, then the optical axes of the output mirror 32 and the rear mirror 30 will be parallel to and offset from each other, and the first and second fold mirrors 34 and 36 will be parallel to each other, both tilted away from the optical axes of the output and rear mirrors 32 and 30 by the same angle. Moreover, the Z-fold cavity will be symmetric if $\theta1=\theta2$ and the path lengths between mirrors 32 and 34 are the same as between mirrors 30 and 36.

Figure 12:
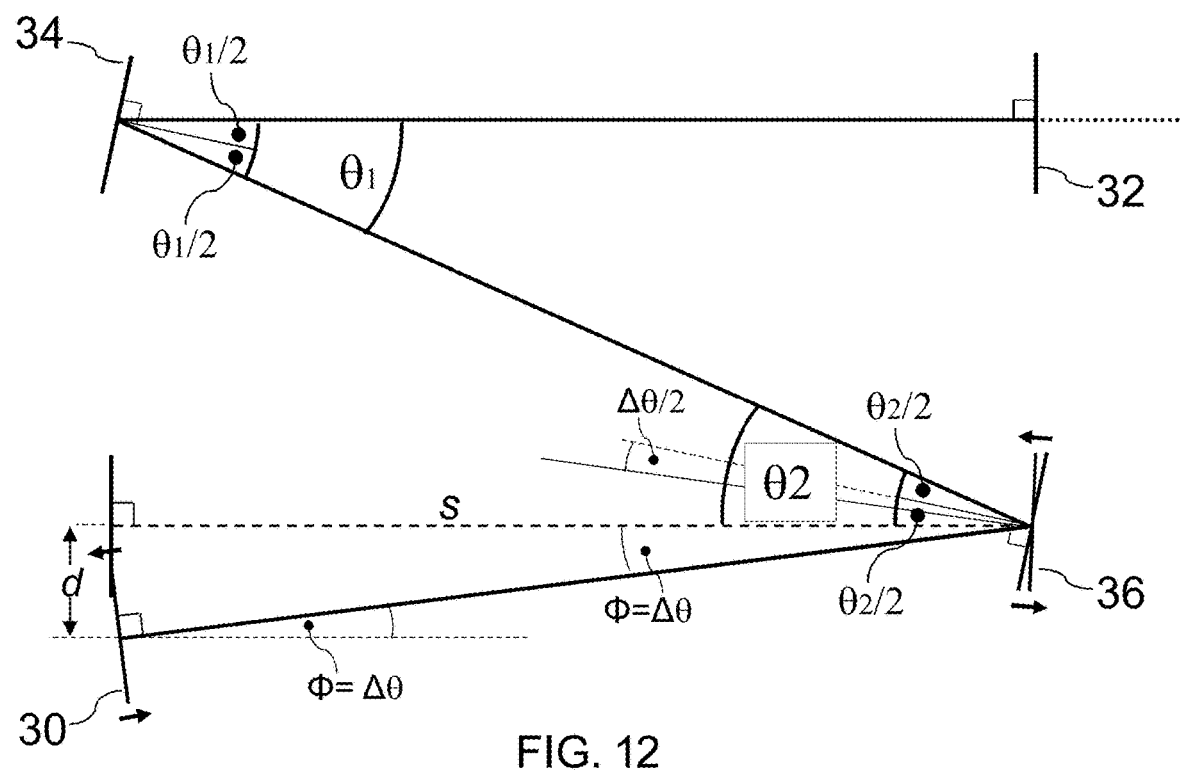
FIG. 12 labels geometrical features of a Z-fold cavity in which the mirrors are arranged according to an embodiment of the invention.

FIG. 12 labels geometrical features of a Z-fold cavity in which the mirrors are arranged unconventionally according to an embodiment of the invention.

The first fold mirror 34 deflects light between the output mirror 32 and the second fold mirror 36 by an angle of 180°−θ1, which means that the first fold mirror 34 is tilted away from the angle of the output mirror 32 by an angle 0.5*θ1, this being the same as in the FIG. 11 case. The second fold mirror 36 deflects light between the first fold mirror 34 and the rear mirror 30 by an angle of 180°−(θ2±Δθ) which requires the tilt of the second fold mirror 34 to be adjusted by an extra amount of 0.5*Δθ compared with the conventional case. In FIG. 12, the nominal extra incremental rotation 0.5*Δθ of the second fold mirror 36 is illustrated as a positive rotation by the short arrows above and below the second fold mirror. The rear mirror 30 is also differently oriented compared to its conventional orientation in that it is rotated by an angle φ which is set to Δθ, i.e. twice the adjustment angle of the second fold mirror 36. In FIG. 12, the nominal extra incremental rotation of the rear mirror 30 is illustrated as a positive rotation (same sense as the incremental rotation of the second fold mirror) by the short arrows above and below the rear mirror. The incremental angular rotations of the rear mirror and second fold mirror compared to their conventional values thus have a ratio of 2:1. The incremental rotations are also in the same sense, which in FIG. 12 is shown as a positive rotational increment (i.e. counterclockwise), but in other embodiments they could be negative rotational increments (i.e. clockwise). It will be understood that the 2:1 ratio may be departed from somewhat in embodiments of the invention, either merely because of limitations in the accuracy of the mirror placement, or because complex effects, such as effects associated with higher order waveguide modes or complex parasitic paths, mean that in operation a slight deviation from the 2:1 ratio is shown empirically to be beneficial. For example, the ratio may be in the range 2±0.5:1; 2±0.4:1; 2±0.3:1; 2±0.2:1; 2±0.1:1; 2±0.05:1 or 2±0.01:1.

The unconventional tilt angles of the second fold mirror 36 and rear mirror 30 mean that it is also beneficial to reposition the rear mirror 30 by nominally displacing it from the position it would occupy conventionally. The nominal displacement is made to move the rear mirror 30 so that it centrally receives the beam reflected from the second fold mirror 36, taking account of the unconventional tilt angle thereof. The displacement amount relates to the distance 's' between the second fold mirror and rear mirror, as well as the change in deflection angle Δθ. By simple geometry, the displacement amount 'd' should be equal to the tangent of the adjustment angle φ, i.e. at least approximately Δθ, multiplied by the distance 's' from the second fold mirror to the rear mirror. The displacement of the rear mirror thus compensates for the tilt adjustment of the second fold mirror. FIG. 12 shows the nominal displacement as downward in view of the positive tilt increment of the second fold mirror, but it would be upward if the tilt increment were negative. It will be understood that the displacement 'd' need not to be precisely d=s*tan Δθ, but may differ from that amount somewhat in embodiments of the invention, either merely because of limitations in the accuracy of the mirror placements, or because complex effects, such as effects associated with higher order waveguide modes or complex parasitic paths, mean that in operation a slight deviation from displacement amount is shown empirically to be beneficial. For example, the displacement amount may be d=s*tan Δθ±20%, ±10%, ±5%, ±2%, or ±1%.

The suppression of parasitic modes may be particularly important when the cavity end mirrors, i.e. the rear mirror and the output mirror, are curved, since the curvature may tend to give rise to additional parasitic modes.

In specific examples, typical values for the various angles and distances may be as follows. The first fold mirror is arranged to produce a deflection through 180°−θ1 with θ1 between 5 and 10 degrees. The second fold mirror is arranged to produce a deflection through 180°−θ2±0.5*Δθ, wherein θ2 is between 5 and 10 degrees and Δθ is between 1 to 5 degrees, wherein Δθ also specifies the magnitude of the rear mirror incremental tilt. The cavity length (i.e. half the round trip beam path) is not linked to the deflection angles, but rather other factors such as the lasing wavelength and desired output power, power stability and resonator mode size and output beam quality. For a carbon dioxide laser emitting at a wavelength of approximately 10 micrometers, the cavity length may be between 500 millimeters and 2000 millimeters, for example.

In one embodiment, compared to a conventional Z-fold arrangement in which the output mirror and the rear mirror are arranged parallel to and offset from each other to define respective parallel and offset optical axes, and the first and second fold mirrors are arranged tilted away from the optical axes of the output and rear mirrors respectively by respective tilt angles that are equal to each other, the second fold mirror is tilted by a tilt angle equal to the tilt angle of the first fold mirror less an adjustment angle, and the rear mirror is tilted away from its conventional position in an opposite rotational sense to the tilt of the first fold mirror by a tilt angle at least approximately equal to twice the adjustment angle, thereby to suppress parasitic mode paths that would otherwise exist without these angular adjustments. The rear mirror is also preferably laterally displaced so as centrally to take account of the tilt adjustment of the second fold mirror.

Implementations of the proposed design with unconventionally tilted cavity mirrors are based on a single slab and a Z-fold resonator and may be particularly useful for unstable or confocal resonators, i.e. resonators with a stability condition that is less than or equal to zero or greater than unity, in particular for such resonators which are negative-branch.

While the above-described embodiments disclose the unconventional Z-fold design in the context of a vacuum enclosure design in which the electrodes are an integral part of the vacuum enclosure with inner surfaces forming the plasma discharge gap and outer surfaces that are outside the vacuum enclosure, it will be appreciated that the proposed single slab, unconventional Z-fold design is not specific to any particular design of vacuum enclosure, so is for example also implementable with a vacuum enclosure design as per U.S. Pat. No. 4,719,639 A (Tulip), i.e. a conventional vacuum enclosure design with both electrodes arranged wholly inside the vacuum enclosure, or the vacuum enclosure of U.S. Pat. No. 7,460,577 B2 (Morrow) in which the electrodes are arranged outside the vacuum enclosure.

Figure 13:
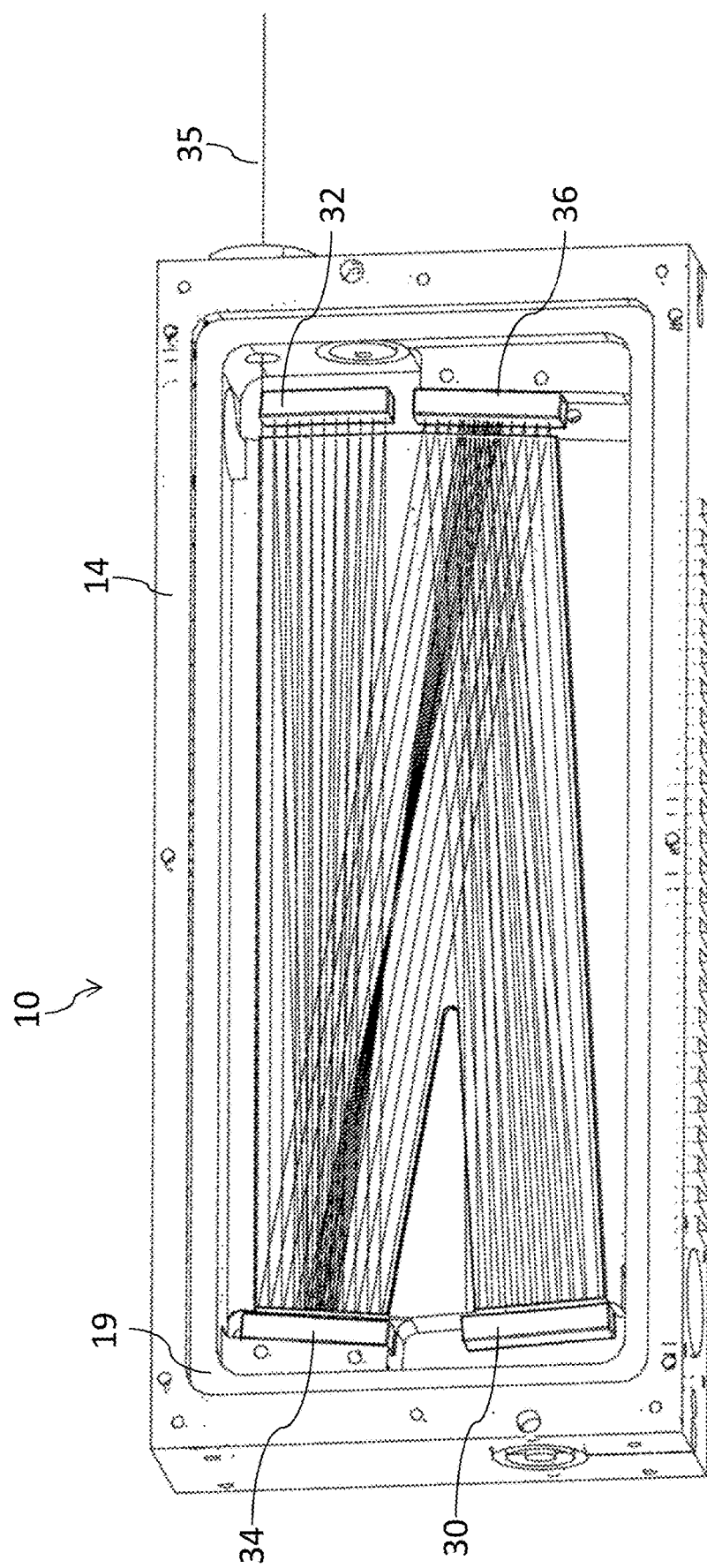
FIG. 13 is a schematic perspective view of a prototype Z-fold cavity, single slab laser as described with reference to FIGS. 9 to 12.

FIG. 13 is a schematic perspective view of a prototype Z-fold cavity, single slab laser as described with reference to FIGS. 9 to 12. In FIG. 13, the lid 12 of the vacuum enclosure is 'removed' to show the modelled mode path structure of the lasing mode between the cavity mirrors 30, 32, 34 and 36, and the laser output 35 from the lateral side of the output mirror 32. The gasket-receiving surface 19 of the box electrode 14 is also labelled. This example prototype has a Z-fold negative-branch confocal unstable resonator with a cavity length of about 1.0 m and a symmetric fold-angle θ1=θ2=5°. The adjustment angle Δθ=2.0° and the downward displacement of the end mirror d=20 mm. The parasitic modes 'A' and 'B' of FIGS. 10A & 10B which would exist without the extra incremental rotations of the second fold and rear mirrors are defeated, since their paths do not form a reciprocating round-trip, but rather "walk" out of the cavity, i.e. fall laterally beyond the side of at least one the cavity mirrors necessary to support a reciprocating round trip of each parasitic mode.

Referring generally to the proposed designs, in some embodiments, the gain medium is a gas. A gas of particular interest is carbon dioxide. Other gases of interest include any suitable molecular or atomic gases, or mixtures thereof, e.g. carbon monoxide, helium, nitrogen. Further, it will be understood that some lasers, in particular gas lasers, are sealed units supplied with the gain medium, e.g. gas, encapsulated in the laser as part of the product as shipped to the customer, whereas other lasers, in particular gas lasers, are shipped without the gain medium. Namely, with a gas laser, the laser may be shipped without the gas and the customer introduces the gas at the time of use, e.g. with appropriate plumbing and gas supply lines. The claims should therefore be understood as not necessarily including the gain medium, but rather only to mean that the slab provides a suitable volume for accommodating a gain medium which may or may not form part of the laser unit when not being prepared in use. As well as for lasers with gaseous gain media, the asymmetric Z-fold design may also be applied to other types of gain medium, i.e. solid and liquid gain media.

Generally it will be appreciated that for all reflecting and focusing activity in optics, mirror and lens elements are at least in principle freely substitutable, so that while specific embodiments described in this document are realized with mirrors in principle each specific mirror embodiment will have a lens equivalent. For example, a cylindrical lens and planar mirror could be substituted for a cylindrical mirror to achieve the equivalent optical result. Moreover, it will be understood that when a mirror is specified this could be implemented with a multi-component mirror assembly comprising a plurality of mirrors, or a plurality of optical elements including at least one mirror and at least one lens.

The laser design described above can be defined by the following numbered clauses.

Clause 1. A laser comprising: a resonator cavity defined between a rear mirror and an output mirror; a first electrode and a second electrode having respective internal and external surfaces, wherein their respective internal surfaces face each other and are spaced apart by a gap forming a slab of a thickness dimensioned to allow a plasma discharge to be formed in the resonator cavity by driving at least the first electrode with a radio frequency, RF, electrical drive signal; and a vacuum enclosure comprising a first part that is integral with the first electrode and a second part that is integral with the second electrode, wherein the first and second electrodes have their respective internal surfaces inside the vacuum enclosure and their respective external surfaces outside the vacuum enclosure.

Clause 2: The laser of clause 1, wherein the first part of the vacuum enclosure has the form of a lid and the second part has the form of a box, the lid and box together forming a sealed container defining the vacuum enclosure.

Clause 3: The laser of clause 2, wherein the lid is electrically isolated from the box by a vacuum gasket made of electrically insulating material arranged therebetween.

Clause 4. The laser of clause 1, wherein the vacuum enclosure further comprises a sidewall part, the first part of the vacuum enclosure has the form of a lid and the second part of the vacuum enclosure has the form of a base, and wherein the lid, base and sidewall part together form a sealed container defining the vacuum enclosure.

Clause 5: The laser of clause 4, wherein the lid is electrically isolated from the base by: (i) the sidewall part being made of electrically insulating material; and/or (ii) a vacuum gasket made of electrically insulating material arranged between the lid and the sidewall part; and/or (iii) a further vacuum gasket made of electrically insulating material arranged between the sidewall part and the base.

Clause 6: The laser of any preceding clause, further comprising a plurality of inductors connected between the external surface of the first electrode and the external surface of the second electrode and arranged lengthwise along the slab, said inductors forming part of an impedance matching network, wherein the inductors are removably attached so that they can be exchanged without accessing the vacuum enclosure.

Clause 7: The laser of any preceding clause, further comprising an RF source connected to the external surface of the first electrode and operable to supply a first RF electrical drive signal to the first electrode to generate the plasma discharge in the gap.

Clause 8: The laser of clause 7, wherein the external surface of the second electrode is connected to an electrical ground.

Clause 9: The laser of clause 7, wherein the RF source is also connected to the external surface of the second electrode and is operable to supply a second RF electrical drive signal to the second electrode that is out of phase with the first RF electrical drive signal to generate the plasma discharge in the gap.

Clause 10: The laser of any preceding clause, further comprising an RF outer shield which is arranged to surround the first and second electrodes and which is connected to an electrical ground.

Clause 11: The laser of any of clauses 1 to 10, wherein the thickness of the slab is dimensioned to support a finite number of discrete waveguide modes and the slab has a width dimensioned to support free space modes.

Clause 12: The laser of any of clauses 1 to 10, wherein the thickness of the slab is dimensioned to support free space modes and the slab has a width dimensioned to support free space modes.

Clause 13: The laser of any preceding clause, wherein the laser further comprises at least one fold mirror, the or each fold mirror being arranged at an end of the slab to provide the resonator cavity with a laser optical resonator path including an additional forward and backward traversal of the slab.

Clause 14: The laser of clause 13, having first and second fold mirrors which, together with the output and rear mirrors, form a Z-fold cavity arrangement, the resonator cavity comprising a round trip beam path that traverses the slab a first time from the output mirror to the first fold mirror, a second time from the first fold mirror to the second fold mirror and a third time from the second fold mirror to the rear mirror, and then back again with fourth, fifth and sixth traversals from the rear mirror to the second fold mirror, the second fold mirror to the first fold mirror, and from the first fold mirror to the output mirror respectively, wherein the second fold mirror is rotated by an adjustment angle away from the angle it would have if the mirrors were all plane mirrors and directed the round trip beam path by direct reflection, and wherein the rear mirror is rotated by an adjustment angle that is approximately twice the adjustment angle of the second fold mirror away from the angle it would have if the mirrors were all plane mirrors and directed the round trip beam path by direct reflection.

Clause 15: The laser of clause 14, wherein the rear mirror is displaced from the position it would have if the mirrors were all plane mirrors and directed the round trip beam path by direct reflection by an amount at least approximately equal to its adjustment angle multiplied by the distance from the second fold mirror to the rear mirror.

It will be clear to one skilled in the art that many improvements and modifications can be made to the foregoing exemplary embodiment without departing from the scope of the present disclosure.

What is claimed is:

1. A laser comprising:
    a first electrode and a second electrode having respective first and second mutually facing surfaces that are spaced apart by a gap to form a slab, the gap being dimensioned to allow a plasma discharge to be formed by applying a radio frequency, RF, electrical drive signal across the gap; and
    a Z-fold resonator cavity including the slab and defined by an output mirror, a first fold mirror, a second fold mirror and a rear mirror, the resonator cavity comprising a round trip beam path that traverses the slab a first time from the output mirror to the first fold mirror, a second time from the first fold mirror to the second fold mirror and a third time from the second fold mirror to the rear mirror, and then back again with fourth, fifth and sixth traversals from the rear mirror to the second fold mirror, the second fold mirror to the first fold mirror, and from the first fold mirror to the output mirror respectively,
    wherein the second fold mirror is rotated by an adjustment angle away from the angle it would have if the mirrors were all plane mirrors and directed the round trip beam path by direct reflection, and
    wherein the rear mirror is rotated by an adjustment angle that is approximately twice the adjustment angle of the second fold mirror away from the angle it would have if the mirrors were all plane mirrors and directed the round trip beam path by direct reflection,
    thereby to suppress parasitic mode paths that would otherwise exist without the second fold mirror and the rear mirror being rotated away from direct reflection by said adjustment angles.

2. The laser of claim 1, wherein the rear mirror is displaced from the position it would have if the mirrors were all plane mirrors and directed the round trip beam path by direct reflection by an amount at least approximately equal to its adjustment angle multiplied by the distance from the second fold mirror to the rear mirror.

3. The laser of claim 1, wherein at least one of the output mirror and the end mirror is curved.

4. The laser of claim 1, wherein at least one of the first and second fold mirrors is curved.

5. The laser of claim 4, wherein at least one of the rear and output mirrors is plano.

6. The laser of claim 1, wherein the first fold mirror deflects light between the output mirror and second fold mirror by an angle of 180 degrees minus a first deflection angle, wherein the first deflection angle is between 5 and 10 degrees, and wherein the second fold mirror deflects light between the first fold mirror and the rear mirror by an angle of 180 degrees minus a second deflection angle, wherein the second deflection angle is between 5 and 10 degrees plus or minus the adjustment angle of the rear mirror, wherein the adjustment angle of the rear mirror is between 1 and 5 degrees.

7. The laser of claim 1, wherein the round trip beam path has a length of between twice 500 millimeters and 2000 millimeters.

8. The laser of claim 1, wherein the output mirror provides output coupling at an edge region thereof or adjacent thereto.

9. The laser of claim 1,
    wherein the first and second electrodes have respective first and second external surfaces as well as their respective first and second mutually facing surfaces, and
    wherein for assisting formation of the plasma discharge a vacuum enclosure is provided comprising a first part that is integral with the first electrode and a second part that is integral with the second electrode, wherein the first and second electrodes have their respective first and second mutually facing surfaces inside the vacuum enclosure and their respective first and second external surfaces outside the vacuum enclosure.

10. The laser of claim 9, wherein the first part of the vacuum enclosure has the form of a lid and the second part has the form of a box, the lid and box together forming a sealed container defining the vacuum enclosure.

11. The laser of claim 10, wherein the lid is electrically isolated from the box by a vacuum gasket made of electrically insulating material arranged therebetween.

12. The laser of claim 9, wherein the vacuum enclosure further comprises a sidewall part, the first part of the vacuum enclosure has the form of a lid and the second part of the vacuum enclosure has the form of a base, and wherein the lid, base and sidewall part together form a sealed container defining the vacuum enclosure.

13. The laser of claim 12, wherein the lid is electrically isolated from the base by the sidewall part being made of electrically insulating material.

14. The laser of claim 12, wherein the sidewall part is made of an electrically conducting material, and wherein the sidewall part is electrically isolated from the base by a vacuum gasket made of electrically insulating material arranged between the lid and the sidewall part and a further vacuum gasket made of electrically insulating material arranged between the sidewall part and the base.

15. The laser of claim 14, wherein the sidewall part is connected to an electrical ground.

16. The laser of claim 1, further comprising a plurality of inductors connected between the external surface of the first electrode and the external surface of the second electrode and arranged lengthwise along the slab, said inductors forming part of an impedance matching network, wherein the inductors are removably attached so that they can be exchanged without accessing the vacuum enclosure.

17. The laser of claim 1, further comprising an RF source connected to the external surface of the first electrode and operable to supply a first RF electrical drive signal to the first electrode to generate the plasma discharge in the gap.

18. The laser of claim 17, wherein the external surface of the second electrode is connected to an electrical ground.

19. The laser of claim 17, wherein the RF source is also connected to the external surface of the second electrode and is operable to supply a second RF electrical drive signal to the second electrode that is out of phase with the first RF electrical drive signal to generate the plasma discharge in the gap.

20. The laser of claim 1, further comprising an RF outer shield which is arranged to surround the first and second electrodes and which is connected to an electrical ground.

21. The laser of claim 1, wherein the thickness of the slab is dimensioned to support a finite number of discrete waveguide modes and the slab has a width dimensioned to support free space modes.

22. The laser of claim 1, wherein the thickness of the slab is dimensioned to support free space modes and the slab has a width dimensioned to support free space modes.

* * * * *